United States Patent
McHatet

(10) Patent No.: US 9,887,726 B1
(45) Date of Patent: Feb. 6, 2018

(54) MAGNETIC UTILITY CASE

(71) Applicant: Hamid McHatet, Miami, FL (US)

(72) Inventor: Hamid McHatet, Miami, FL (US)

(*) Notice: Subject to any disclaimer, the term of this patent is extended or adjusted under 35 U.S.C. 154(b) by 0 days.

(21) Appl. No.: 15/407,078

(22) Filed: Jan. 16, 2017

(51) Int. Cl.
  *H04B 1/3888* (2015.01)
  *H04M 1/02* (2006.01)
  *A45C 13/10* (2006.01)

(52) U.S. Cl.
  CPC ........... *H04B 1/3888* (2013.01); *A45C 13/10* (2013.01); *H04M 1/02* (2013.01)

(58) Field of Classification Search
  CPC ............................ A45C 13/1069; A45C 13/10
  USPC ................ 455/575.1, 575.6, 575.8, 90.3
  See application file for complete search history.

(56) References Cited

U.S. PATENT DOCUMENTS

| | | | |
|---|---|---|---|
| 2004/0183313 A1* | 9/2004 | Sherman | A47F 7/03 292/251.5 |
| 2011/0089078 A1* | 4/2011 | Ziemba | A45C 1/04 206/570 |
| 2015/0320168 A1* | 11/2015 | Hoffman | A45C 13/02 206/37 |

* cited by examiner

*Primary Examiner* — John J Lee
(74) *Attorney, Agent, or Firm* — Albert Bordas, P.A.

(57) ABSTRACT

A magnetic utility case for a cell phone has an exterior case, a magnet, a housing, a plate, an insert, and an interior case. The exterior case has a lock assembly at an interior face. The lock assembly has a containing wall inner side. The containing wall inner side has a canal. The lock assembly has an interior edge, a containing wall interior face, and at least one post. The housing has a locking face, an outer sidewall having a ridge, at least one hole extending from the locking face to an inner face, and a lip defined at the locking face. The canal receives the ridge and the at least one hole receives a respective at least post when the housing is placed onto the lock assembly. The housing is positioned in between the interior case and the exterior case when the housing is placed onto the lock assembly.

14 Claims, 5 Drawing Sheets

MAGNETIC UTILITY CASE

BACKGROUND OF THE INVENTION

1. Field of the Invention

The present invention relates to protective cases for electronic devices, and more particularly, to magnetic utility cases.

2. Description of the Related Art

Applicant is not aware of any prior art that suggests the novel features of the present invention.

SUMMARY OF THE INVENTION

The present invention is a magnetic utility case, comprising an exterior case, a magnet, a housing, a plate, an insert, and an interior case.

The exterior case comprises a lock assembly at an interior face. The lock assembly comprises a containing wall inner side. The containing wall inner side comprises a canal.

The lock assembly comprises an interior edge, a containing wall interior face, and at least one post.

The magnet comprises an angled wall, an inner sidewall, an outer sidewall, a flat wall, and external wall.

The housing comprises a locking face, an outer sidewall having a ridge, at least one hole extending from the locking face to an inner face, and a lip defined at the locking face.

The canal receives the ridge and the at least one hole receives a respective at least post when the housing is placed onto the lock assembly.

The insert fits within the magnet. The magnet adheres to the plate, and the plate is contained by the lip when the housing is placed onto the lock assembly. The housing is positioned in between the interior case and the exterior case when the housing is placed onto the lock assembly.

It is therefore one of the main objects of the present invention to provide magnetic utility cases for computers such as, but not limited to, cell phones, smart phones, tablets, or any other electronic devices.

It is another object of this invention to provide a magnetic utility case that is volumetrically efficient for carrying, transporting, and storage.

It is another object of this invention to provide a magnetic utility case that can be readily assembled and disassembled without the need of any special tools.

It is another object of this invention to provide a magnetic utility case, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
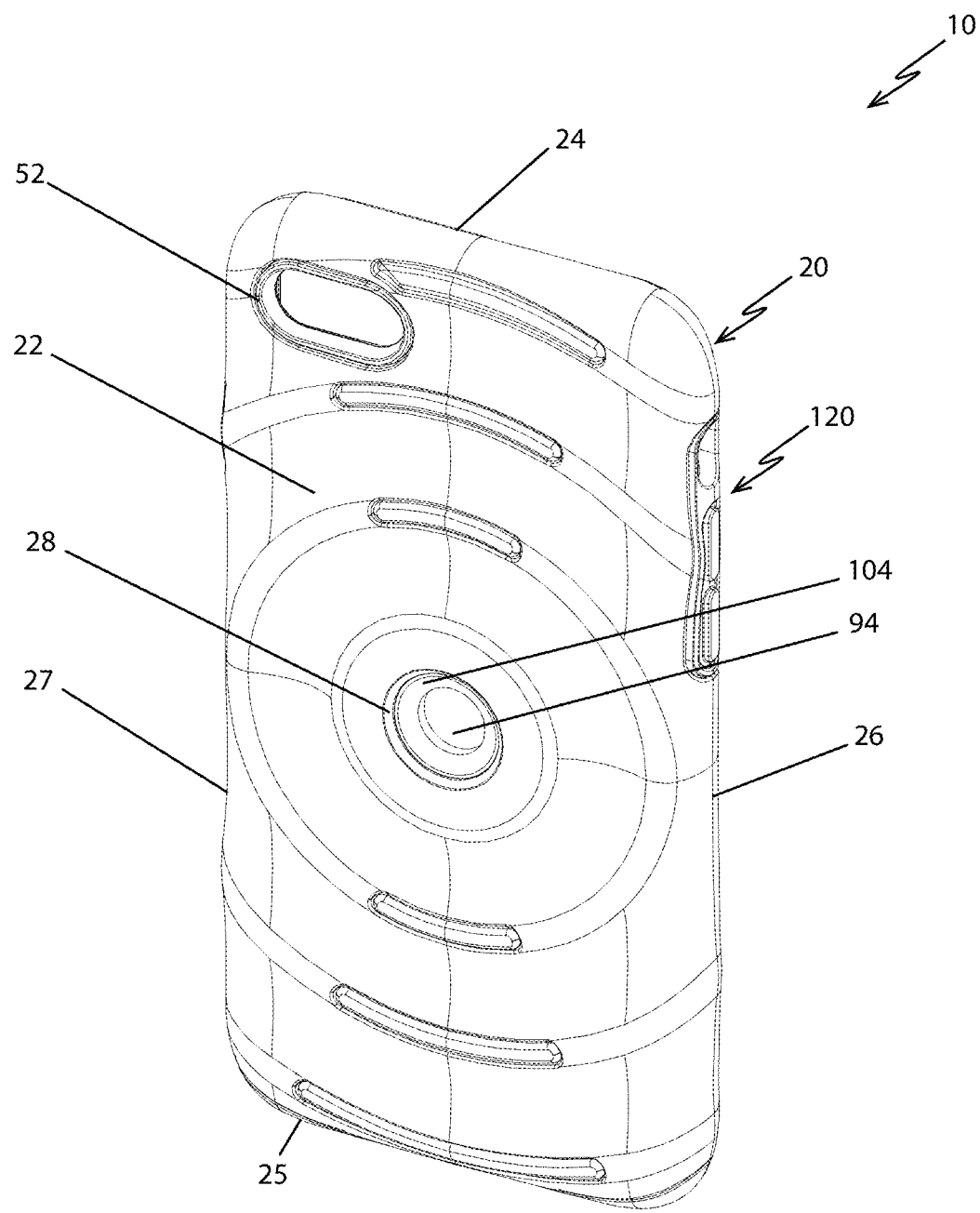
FIG. 1 represents a front isometric view of the magnetic utility case assembled.

Referring now to the drawings, the present invention is a magnetic utility case and is generally referred to with numeral 10. It can be observed that it basically includes exterior case 20, magnet 100, housing 60, plate 80, insert 90, and interior case 120.

Figure 2:
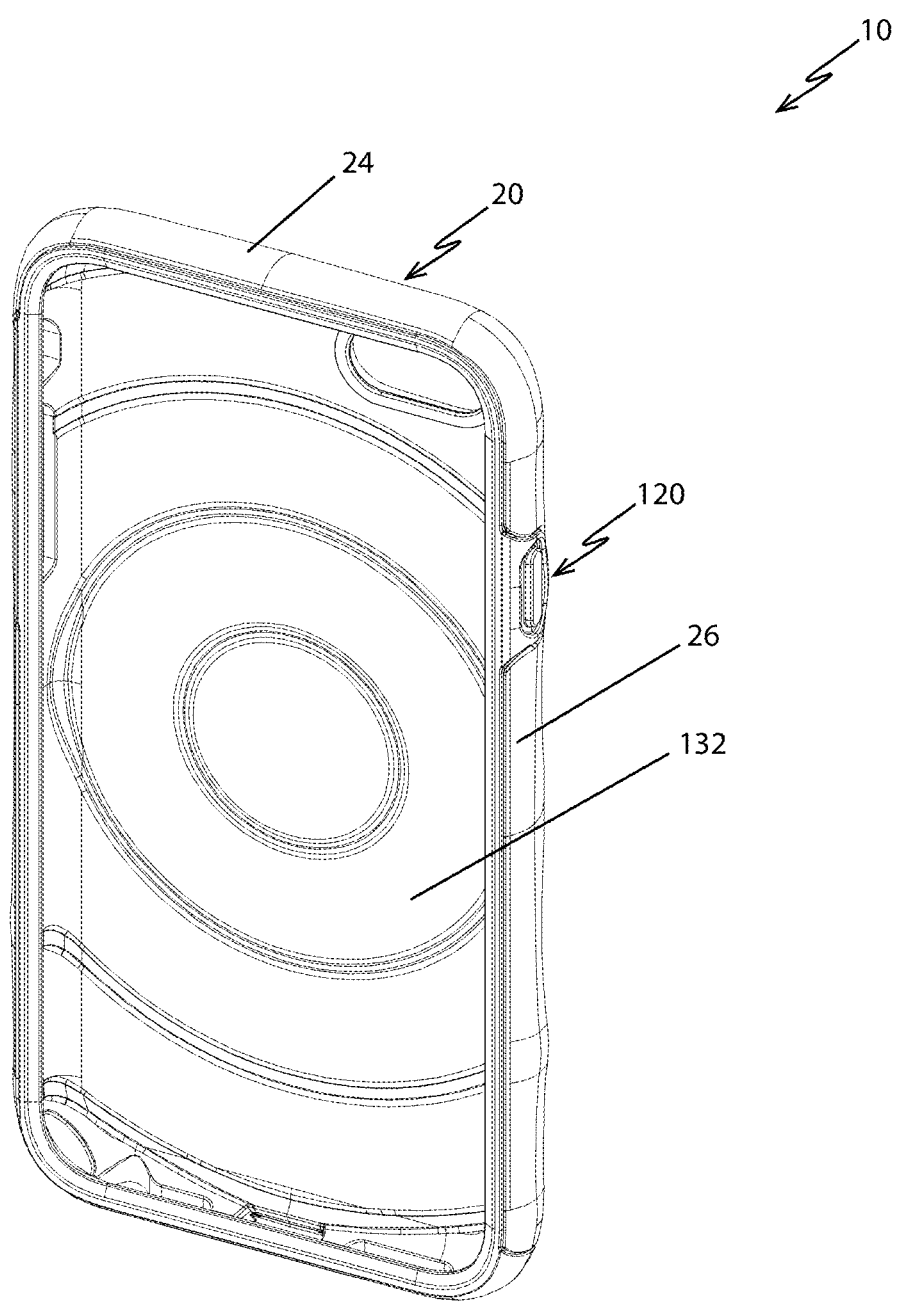
FIG. 2 is a rear isometric view of the magnetic utility case assembled.

As seen in FIGS. 1 and 2, interior case 120 snugly fits within exterior case 20. Exterior case 20 comprises exterior face 22, top edge 24, bottom edge 25, lateral edges 26 and 27, and angled wall 28.

Figure 3:
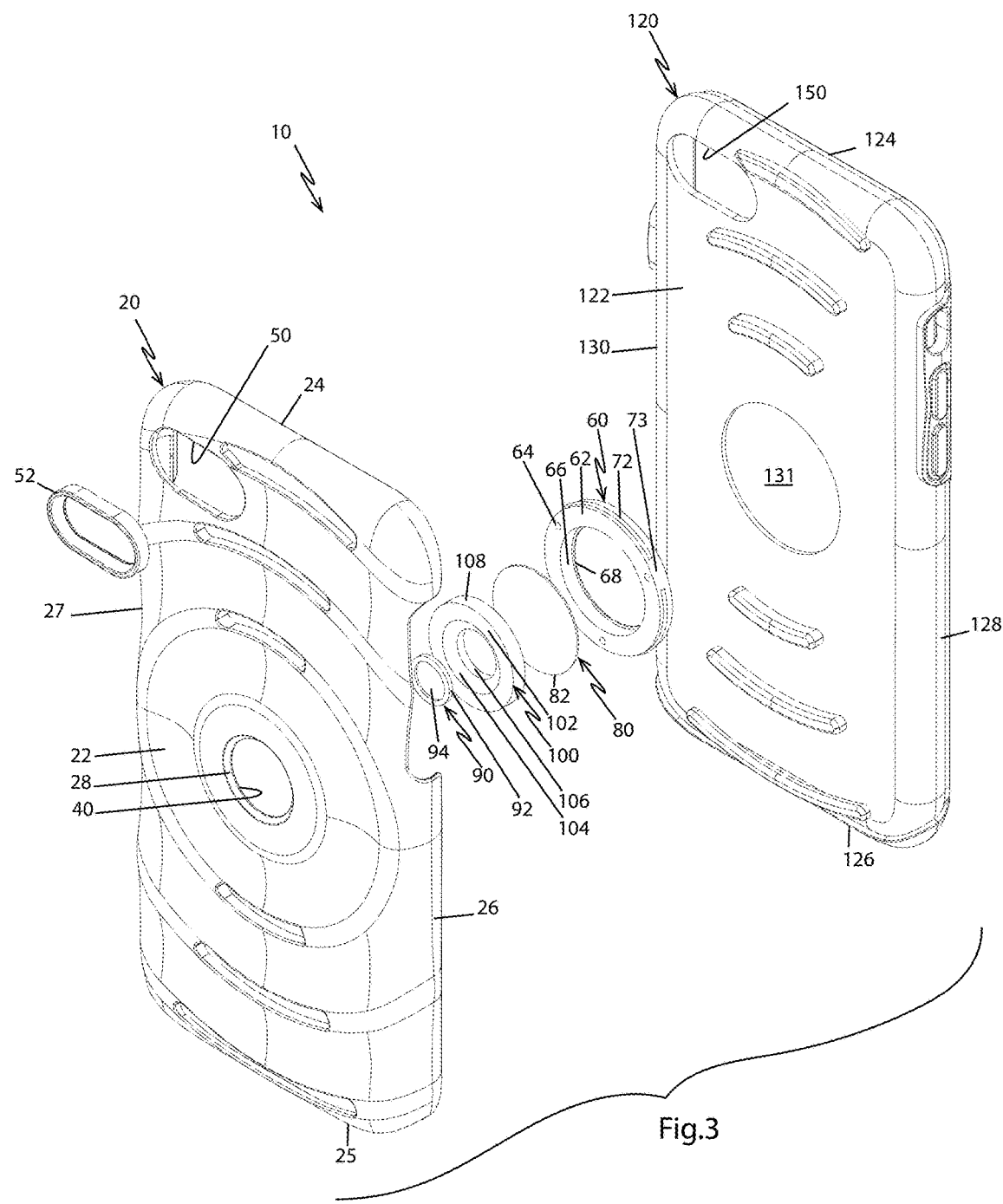
FIG. 3 is a front exploded view of the magnetic utility case.
Figure 4:
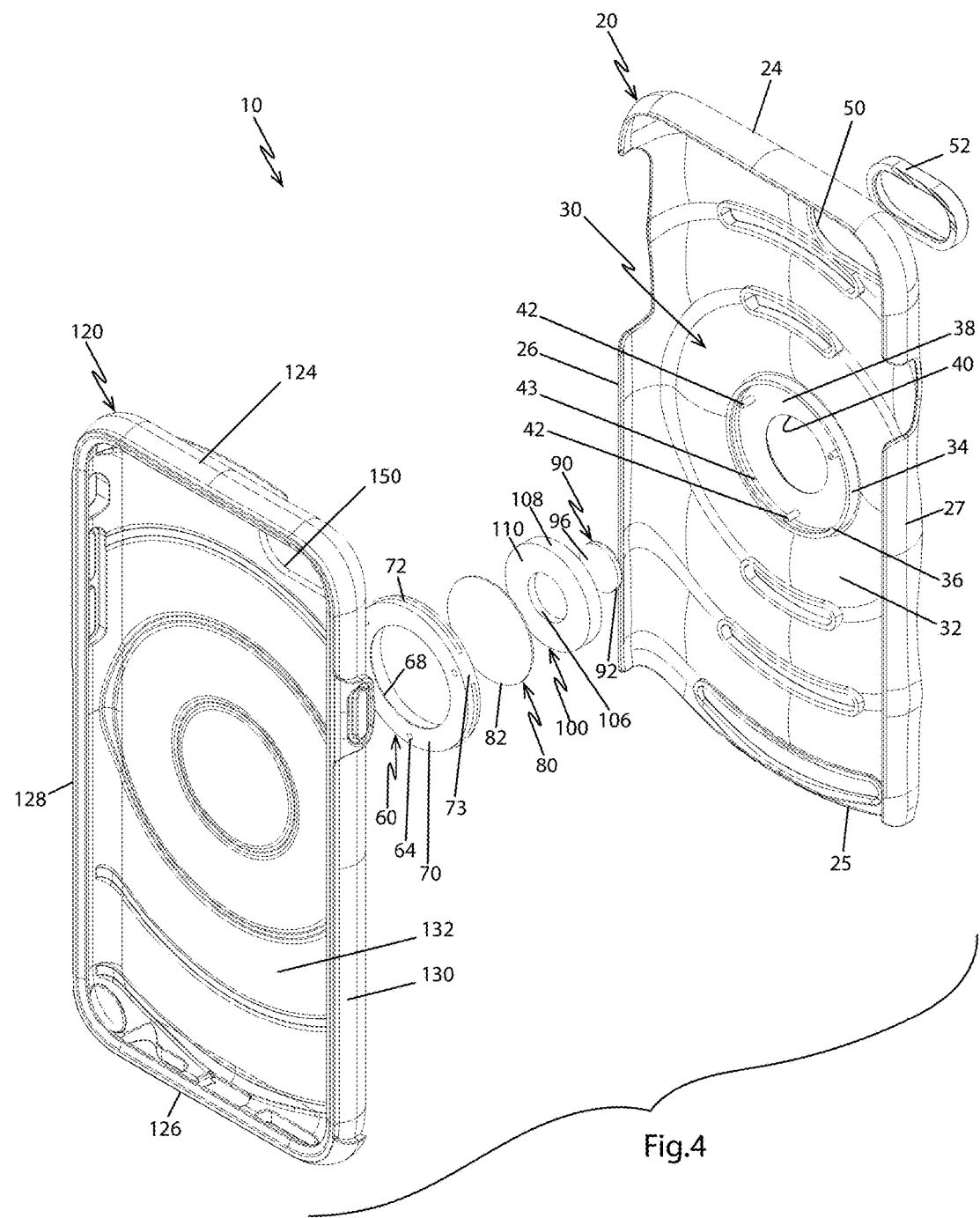
FIG. 4 is a rear exploded view of the magnetic utility case.

As seen in FIGS. 3 and 4, exterior case 20 further comprises lock assembly 30 at interior face 32. Lock assembly 30 comprises containing wall edge inner side 36 having canal 43. In addition, lock assembly 30 comprises containing wall outer side 34, interior edge 40, containing wall interior face 38, and at least one post 42. In a preferred embodiment, lock assembly 30 comprises three posts 42. Exterior case 20 also comprises hole 50 to accommodate seal 52.

Magnet 100 comprises angled wall 104, inner sidewall 106, outer sidewall 108, flat wall 110, and external wall 102.

Housing 60 comprises inner sidewall 66, locking face 70 having lip 68, outer sidewall 73 having ridge 72, and at least one hole 64 extending from locking face 70 to inner face 62. In a preferred embodiment, housing 60 comprises three holes 64.

As best seen in FIG. 4, insert 90 has flat face 96, insert sidewall 92 and concave face 94. Insert 90 fits within magnet 100, whereby an outside diameter of insert 90 is smaller than an inside diameter of inner sidewall 106. Magnet 100 adheres to plate 80, which has edge 82. Lip 68 contains plate 80 when housing 60 is placed onto lock assembly 30. Housing 60 is positioned between cavity 131 of interior case 120, and lock assembly 30. When housing 60 is placed onto lock assembly 30, canal 43 receives ridge 72 and each hole 64 receives a respective post 42.

Interior case 120 comprises interior face 122, top edge 124, bottom edge 126, lateral edges 128 and 130, interior face 132, and hole 150. In a preferred embodiment, interior case 120 is molded and/or manufactured to be slightly smaller in dimensions to snugly fit within exterior case 20. Although not illustrated, it is understood that interior case 120 is designed to snugly contain a computer such as, but not limited to, a cell phone, smart phone, tablet, or any other electronic device.

Figure 5:
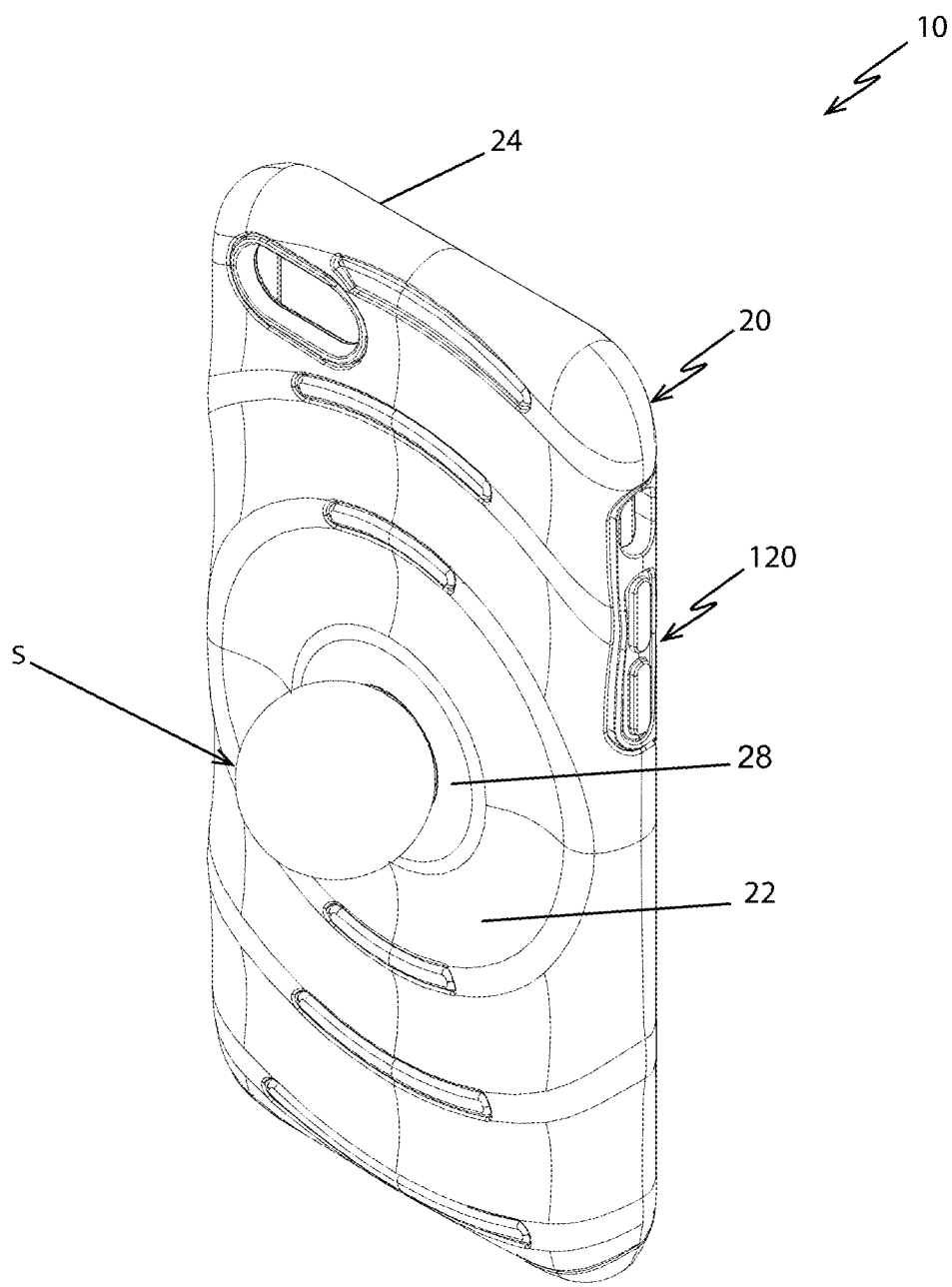
FIG. 5 is an isometric view of the magnetic utility case mounted onto a sphere.

As seen in FIG. 5, present invention 10 may be mounted onto any surface attracted to magnet 100. As an example, present invention 10 may be mounted onto sphere S, whereby the spherical shape of sphere S is accommodated within angled wall 28 of exterior case 20 and angled wall 104 of magnet 100 as seen in FIGS. 3 and 4.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A magnetic utility case, comprising:
   A) an exterior case comprising a lock assembly at an interior face;
   B) a magnet;
   C) a housing comprising a locking face, at least one hole extending from said locking face to an inner face, and a lip defined at said locking face;
   D) a plate;
   E) an insert; and
   F) an interior case, wherein said insert fits within said magnet, said magnet adheres to said plate, and said plate is contained by said lip when said housing is placed onto said lock assembly, and further characterized in that said housing is positioned in between said interior case and said exterior case when said housing is placed onto said lock assembly.

2. The magnetic utility case set forth in claim 1, further characterized in that said lock assembly comprises a containing wall inner side.

3. The magnetic utility case set forth in claim 2, further characterized in that said containing wall inner side comprises a canal.

4. The magnetic utility case set forth in claim 3, further characterized in that said housing comprises an outer sidewall having a ridge.

5. The magnetic utility case set forth in claim 4, further characterized in that said canal receives said ridge when said housing is placed onto said lock assembly.

6. The magnetic utility case set forth in claim 1, further characterized in that said lock assembly comprises an interior edge.

7. The magnetic utility case set forth in claim 1, further characterized in that said lock assembly comprises a containing wall interior face.

8. The magnetic utility case set forth in claim 1, further characterized in that said lock assembly comprises at least one post.

9. The magnetic utility case set forth in claim 8, further characterized in that said at least one hole receives a respective said at least one post when said housing is placed onto said lock assembly.

10. The magnetic utility case set forth in claim 1, further characterized in that said magnet comprises an angled wall.

11. The magnetic utility case set forth in claim 1, further characterized in that said magnet comprises an inner sidewall.

12. The magnetic utility case set forth in claim 1, further characterized in that said magnet comprises an outer sidewall.

13. The magnetic utility case set forth in claim 1, further characterized in that said magnet comprises a flat wall.

14. The magnetic utility case set forth in claim 1, further characterized in that said magnet comprises an external wall.

* * * * *